(12) United States Patent
Ruebusch et al.

(10) Patent No.: US 7,175,012 B2
(45) Date of Patent: Feb. 13, 2007

(54) TRANSMISSION FOR A WALK-BEHIND LAWN MOWER

(75) Inventors: Richard Thomas Ruebusch, Medina, OH (US); Philip Helin, Peninsula, OH (US)

(73) Assignee: MTD Products Inc, Valley City, OH (US)

( * ) Notice: Subject to any disclaimer, the term of this patent is extended or adjusted under 35 U.S.C. 154(b) by 156 days.

(21) Appl. No.: 10/947,941

(22) Filed: Sep. 23, 2004

(65) Prior Publication Data

US 2006/0060017 A1    Mar. 23, 2006

(51) Int. Cl.
*F16D 11/04* (2006.01)

(52) U.S. Cl. ............... 192/69.63; 192/48.8; 74/325

(58) Field of Classification Search ...... 180/19.1–19.3, 180/337; 56/11.3, 11.7, 11.8; 74/325, 333, 74/352–355, 424, 425, 724; 192/20, 69.63, 192/69.82, 48.8
See application file for complete search history.

(56) References Cited

U.S. PATENT DOCUMENTS

| | | | | |
|---|---|---|---|---|
| 4,106,604 | A | * | 8/1978 | Baba .................... 477/113 |
| 4,137,796 | A | * | 2/1979 | Bostrom ................. 74/625 |
| 4,907,401 | A | | 3/1990 | Nemoto et al. |
| 5,718,105 | A | * | 2/1998 | Irikura et al. ........... 56/11.4 |
| 5,887,484 | A | * | 3/1999 | Abend et al. ............ 74/424 |
| 6,205,970 | B1 | * | 3/2001 | Iwata et al. .......... 123/192.2 |
| 6,475,109 | B2 | | 11/2002 | Blanchard |
| 6,701,796 | B2 | | 3/2004 | Blanchard |
| 6,702,059 | B2 | | 3/2004 | Blanchard |
| 6,742,409 | B2 | | 6/2004 | Blanchard |
| 6,761,087 | B2 | | 7/2004 | Blanchard |
| 6,789,441 | B2 | | 9/2004 | Blanchard |
| 6,848,523 | B2 | * | 2/2005 | Ishikawa et al. ......... 180/19.3 |

* cited by examiner

*Primary Examiner*—Lesley D. Morris
*Assistant Examiner*—L. Lum
(74) *Attorney, Agent, or Firm*—Wegman, Hessler & Vanderburg (57) ABSTRACT

A transmission device between a primary motor shaft and a drive shaft for the wheels of self-propelled lawn mowers having a driving member connectable to a motor shaft, an output shaft, and a helically threaded driven gear rotatably mounted and moveable axially on the output shaft, the driven gear including an exterior driving surface and an interior surface, the interior surface including a plurality of teeth fixed in rotation with the gear, the teeth having a sloped leading edge and trailing edges substantially on a plane extending radially outward from the center of the driven gear, the outer engaging surface in constant engagement with the driving member so that the driven gear rotates whenever the driving member rotates. A control member configured to move the driven gear along the axial axis of the output shaft from a first position to a second position, the control member including a fork with two branches, each branch of the fork being provided with a radial internal tooth so as to ensure contact with the driven gear. A projection secured in rotation with the output shaft and extending from the output shaft such that opposite ends of the projection project from the output shaft to engage the interior teeth of the driven gear, projection being positioned on the output shaft such that when the driven gear is in the first position, the projection is disengaged from the interior surface of the driven gear such that the driven gear is uncoupled from the output shaft, and when the driven gear is moved to the second position, the projection engages the interior surface of the driven gear in a locking relationship to produce a driving rotation of the output shaft.

33 Claims, 8 Drawing Sheets

TRANSMISSION FOR A WALK-BEHIND LAWN MOWER

BACKGROUND OF THE INVENTION

1. Field of Invention

This invention relates to transmissions, and more particularly adapted to a transmission device between a primary motor shaft and an output drive shaft connected to the wheels of a self-propelled lawn mower.

2. Description of Related Art

It is known in the art to use variable speed transmission assemblies on self-propelled walk-behind lawn mowers to permit the ground speed of the mower to be varied while maintaining a constant engine speed. A constant engine speed is desirable because it facilitates, for example, effective cutting by the lawnmower mower blade.

Previous variable speed transmission designs have incorporated various gear arrangements or multiple drive belt and multiple pulley systems to propel the lawn mower or tractor while still maintaining a constant engine speed. For example, some planetary gear arrangements include a series of intermeshed gears to provide a suitable mower axle speed when the engine is operating at a relatively fast engine shaft speed. Multiple drive belt and pulley systems typically include at least one belt tensioner or idle pulley which is merely used to maintain tension on the belts. The transmissions have used various clutch designs to connect the motor shaft to the output shaft of the transmission. Typical dog clutch designs require several plates in order to transmit rotation of the input shaft to the output shaft. These designs constitute pieces that are complicated to produce and of relatively high cost. Additionally, these systems generally require more space and greater number of parts, which increase the mower cost since the systems require more expensive production and assembly operations.

An improved variable speed transmission which includes a declutching mechanism that is less costly to manufacture and allows for greater ease of control by the operator is desirable.

SUMMARY OF THE INVENTION

The present invention provides a variable speed transmission which overcomes the disadvantages of prior transmissions and/or speed controls by providing an inexpensive variable speed transmission that is economical to manufacture and requires less space. Additionally, a clutch mechanism is provided on the transmission for clutching and declutching the transmission. Furthermore, the operator need only move the pivot arm of the transmission to cause a change in the speed of the transmission, thereby providing ease of control of the transmission.

In one aspect, the invention is a transmission device for transmitting rotation from a primary motor shaft to an output shaft. The transmission device includes an input shaft in engagement with the primary motor shaft, the input shaft having a driving member including a worm, and a driven gear mounted on the output shaft. The driven gear has a clutching surface and an outer engaging surface, the outer surface being in engagement with the worm. The driven gear is moveable axially along the output shaft between a first position where the driven gear is freely rotatable about the output shaft and a second position. A control member is configured to axially move the driven gear from the first position to the second position on the output shaft. The transmission device also includes a projection on the output shaft that is secured in rotation with the output shaft. The projection is positioned on the output shaft such that when the driven gear is in the first position, the projection is disengaged from the clutching surface of the driven gear to uncouple the driven gear from the output shaft, and when the driven gear is moved to the second position, the projection engages the clutching surface of the driven gear in a locking relationship thereby producing a driving rotation of the output shaft.

In another aspect, the invention is a transmission device for transmitting rotation from a primary motor shaft to an output shaft. The transmission device includes an input shaft in engagement with the primary motor shaft, the input shaft having a driving member including a worm, and an output shaft. The transmission device also includes a helically threaded driven gear rotatably mounted and moveable axially on the output shaft. The driven gear has a threaded exterior driving surface and an interior surface, the interior surface having a plurality of teeth. The teeth have a sloped leading edge and trailing edges substantially on a plane extending radially outward from the center of the driven gear. The outer engaging surface of the driven gear is in continual engagement with the worm so that the driven gear rotates whenever the input shaft rotates. The transmission device also includes a control member configured to move the driven gear axially along the output shaft from the first position to the second position. The control member includes a fork with two branches, each branch of the fork being provided with a radial internal tooth so as to ensure contact with the driven gear. The transmission device also includes a projection extending from the output shaft and rotatable with the output shaft. Opposite ends of the projection project from the output shaft to engage the interior teeth of the driven gear. The projection is positioned on the output shaft such that when the driven gear is in the first position, the projection is disengaged from the interior surface of the driven gear so that the driven gear is uncoupled from the output shaft, and when the driven gear is moved to the second position, the projection engages the interior surface of the driven gear in a locking relationship to produce a driving rotation of the output shaft.

In yet a further embodiment, the invention is a transmission device for transmitting rotation from a primary motor shaft to an output shaft on a self propelled machine. The transmission device includes a drive pulley mounted on a primary motor shaft, a driven pulley, and a belt between the drive pulley and the driven pulley to transmit rotation of the drive pulley to the driven pulley. The transmission device includes a clutch engaging mechanism having an input shaft connected to the driven pulley and an output shaft coupled to drive wheels of the machine. The clutch engaging mechanism includes an input shaft in engagement with the primary motor shaft, the input shaft having a driving member including a worm, and a driven gear mounted on the output shaft. The driven gear has an interior clutching surface and an outer engaging surface, the outer surface being in engagement with the worm. The driven gear is moveable axially along the output shaft between a first position where the driven gear is freely rotatable about the output shaft and a second position. A control member is configured to axially move the driven gear from the first position to the second position on the output shaft. The transmission device also includes a projection on the output shaft that is secured in rotation with the output shaft. The projection is positioned on the output shaft such that when the driven gear is in the first position, the projection is disengaged from the interior surface of the driven gear to uncouple the driven gear from the output shaft, and when the driven gear is moved to the second position, the projection engages the interior surface of the driven gear in a locking relationship thereby producing a driving rotation of the output shaft.

The clutch engaging mechanism is disposed within a housing that is rotatably mounted about the output shaft in the direction of tension or relaxation of the belt of the transmission under the action of a pivoting lever that projects from the housing. The pivoting lever is mechanically coupled to the control member of the clutch engaging mechanism so as to cause, during pivoting of the lever, passage to the clutch engaged position of the clutch engaging mechanism. Then, in the second instance, by co-action of the lever with an abutment provided on the housing, oscillation of the housing to tension of the belt to obtain movement of the machine, wherein a variation of a speed of the machine is obtained by variation of the tension applied to the belt with the help of the pivoting lever disposed outside the clutch engaging housing.

In yet another aspect, the invention is a propelled machine having a motor driving at least one ground engaging wheel, the machine having transmission device for transmitting rotation from a primary motor shaft to an output shaft driving the ground engaging wheel. The propelled machine includes a machine deck, a motor mounted on the machine deck, the motor having a motor output shaft, and at least one ground engaging wheel. The machine also includes a transmission operatively connecting the motor output shaft and the ground engaging wheel. The transmission includes an input shaft in engagement with the primary motor shaft, the input shaft having a worm and an output shaft. A helically threaded driven gear is rotatably mounted and moveable axially on the output shaft. The driven gear has an exterior driving surface and an interior surface, the outer engaging surface in constant engagement with the driving member so that the driven gear rotates whenever the input shaft rotates. The transmission further includes a control member configured to axially move the driven gear along the output shaft from a first position to a second position. The transmission further includes means for rotatably securing the driven gear to the output shaft such that such that when the driven gear is in the first position, the driven gear is uncoupled from the output shaft, and when the driven gear is moved to the second position, the driven gear is coupled to the output shaft so that the output shaft rotates with the driven gear.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
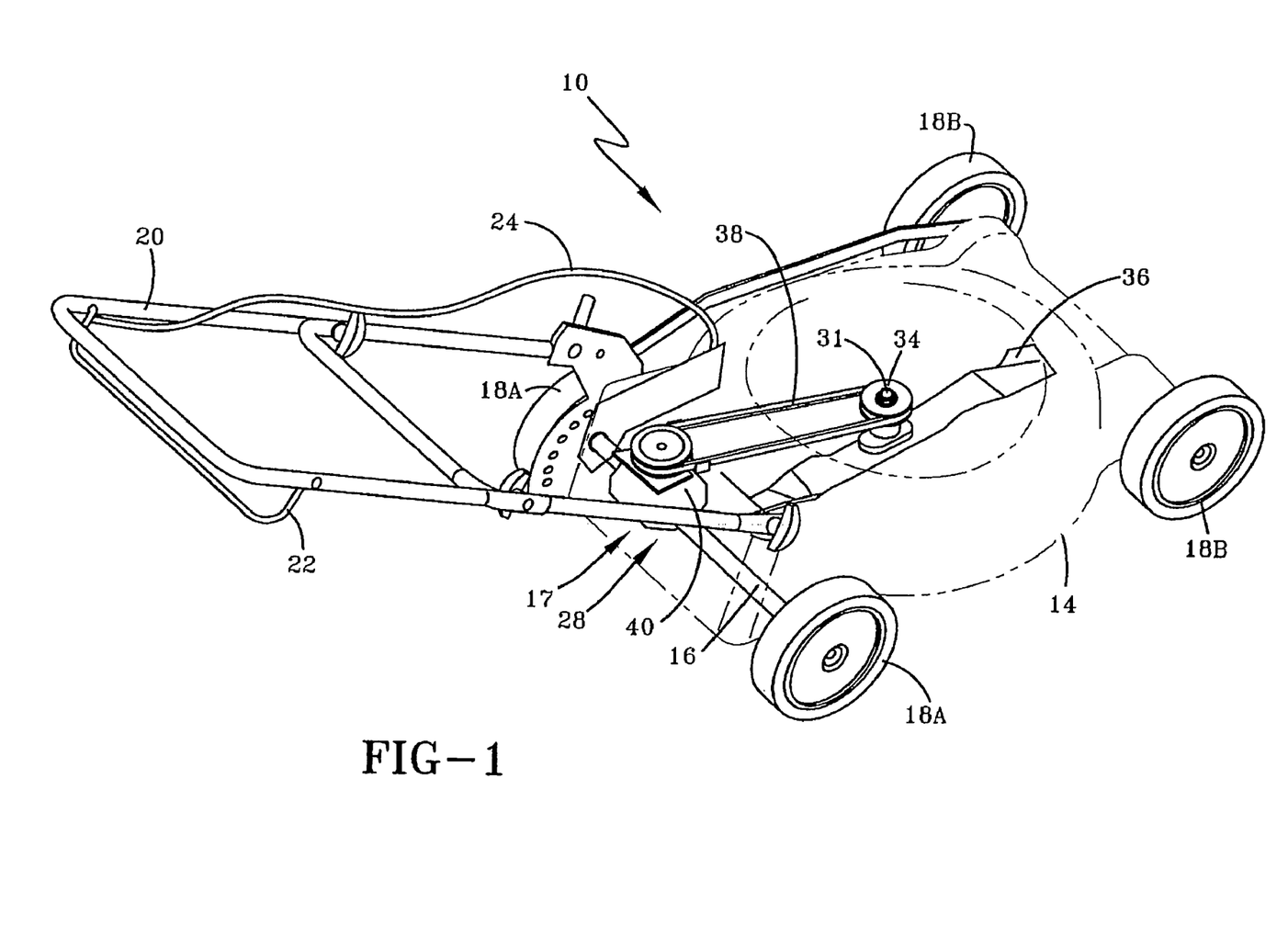
FIG. 1 is a partially cut away perspective view of a self-propelled lawnmower having a transmission according to the invention.
Figure 2:
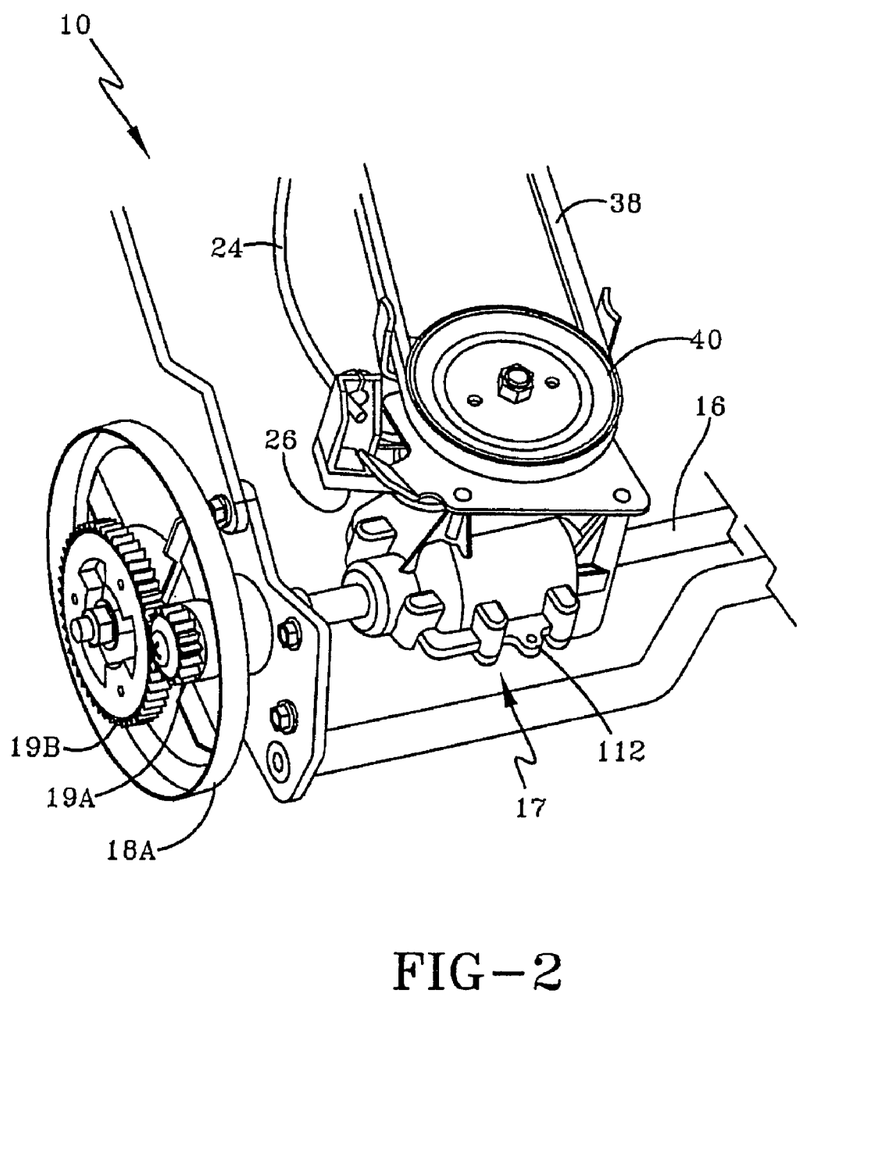
FIG. 2 is an enlarged cutaway perspective view of an alternate embodiment of the transmission of FIG. 1.
Figure 3:
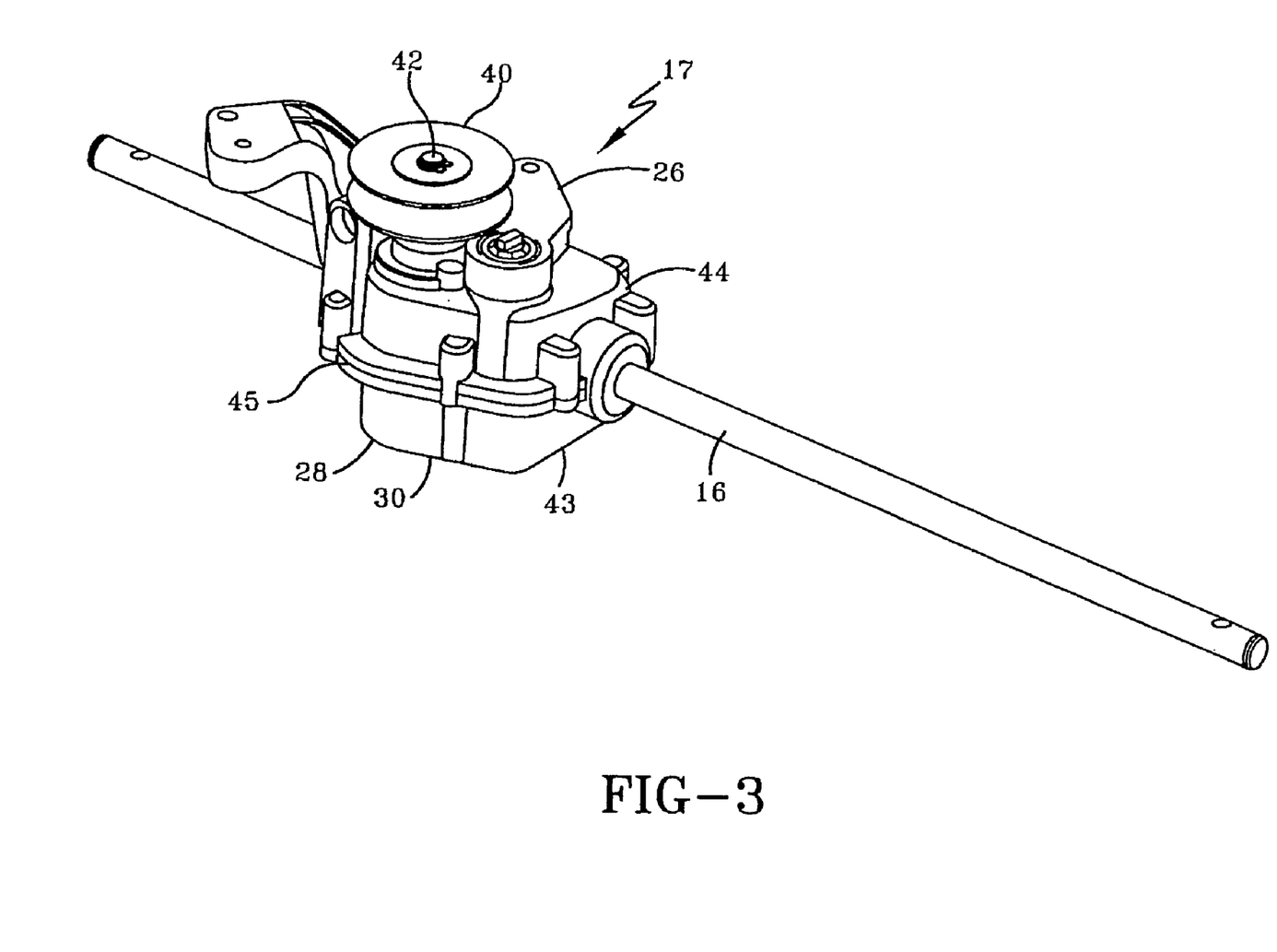
FIG. 3 is a perspective view of the transmission of FIG. 1.

Referring first to FIGS. 1–3, a self-propelled lawnmower, broadly a self-propelled machine, is shown generally at 10 having engine (not shown to improve clarity) mounted on deck 14. Although the current invention is shown in an embodiment describing a lawnmower, the invention could equally as well be used with other self-propelled machines such as yard vacuums, snow throwers, tillers and the like. An axle 16 is rotatably mounted to the deck 14 and controlled by a variable speed transmission indicated at 17 coupled to the engine. Ground engaging wheels 18 are connected to the ends of axle 16 of the lawnmower 10. In the embodiment illustrated in FIG. 1, rear wheels 18A constitute the drive wheels for the lawn mower 10. Alternately, as shown in FIG. 2, front wheels 18B may be used as the drive wheels without departing from the scope of the invention. Gears 19A mounted on the opposite ends of the axle 16 mesh with gears 19B provided on the ground engaging wheels 18 so as to drive the ground engaging wheels as is known in the art. It is to be noted that the connection between the axle 16 and the wheels 18 of the self-propelled machine 10, can be of any type understood by a skilled practitioner. A handle 20 is attached to the deck 14 for use by the operator to maneuver the lawnmower 10. Handle 20 includes a control mechanism 22 used to control the transmission 17. The control mechanism 22 is used by the operator to operate a cable linkage 24. The cable linkage 24 connects to an actuator lever 26 that selectively engages or disengages a clutch mechanism 28 provided in a housing assembly 30 as will be described below in further detail, thereby controlling movement of the self-propelled lawnmower 10.

The transmission 17 desirably provides a transition between a primary motor shaft 31 of the engine and the output shaft of the clutch engaging mechanism 28, which in this case is the axle 16. The motor shaft 31 carries an output pulley 34 and a mowing blade 36. A belt 38 transmits power from the output pulley 34 to an input pulley 40 connected to an input shaft 42 of the clutch mechanism 28. Desirably, the tension of belt 38 is adjustable to vary the rotational speed of the input shaft 42 and thus the speed of rotation of the ground engaging wheels 18 to thereby control the speed of the self-propelled machine 10 as will be discussed more fully below. In the illustrated embodiment, the housing assembly 30 of the clutch mechanism 28 includes a lower shell 43 and an upper shell 44 that are fastened together by a plurality of bolts (not shown) or other fasteners at interface 45.

Figure 4:
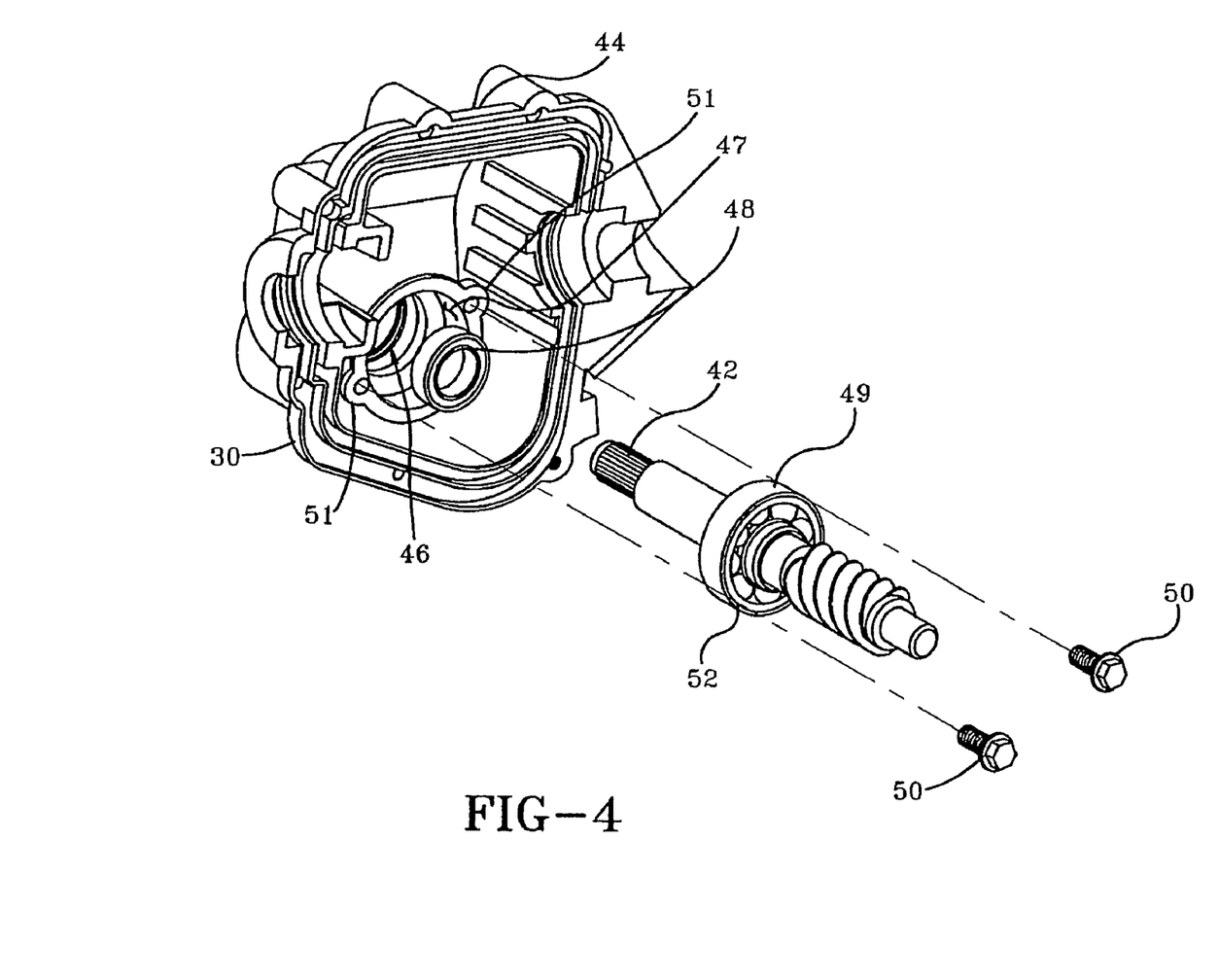
FIG. 4 is an exploded perspective view of an upper portion of the transmission of FIG. 3.

Referring now to FIG. 4, the input shaft 42 passes through an opening 46 in the upper shell 44. The opening 46 is located within a bearing recess 47 formed in the upper shell 44. An oil seal 48 provides a substantially tight seal through which the input shaft 42 passes. Bearing 49 is positioned within the bearing recess 47 and is secured therein with fasteners 50. Preferably, bearing 49 is a roller bearing, however other bearings may be used using sound engineering judgment. In one embodiment, the fasteners 50 comprise two self-tapping screws that are screwed into bosses 51 located adjacent the outer circumferential edge of the bearing recess 47. Heads of the screws 50 overlap the outer race 52 of the bearing 49 to immobilize axially or hold the bearing in place within the bearing recess 47. Thus, the input shaft 42 is held by interference fit in the bearing 49, and the downward thrust load on the input shaft is taken by the screws 50 clamping the outer race 52 of the bearing 49. Thrust load on the input shaft 42 is taken by the bearing 49 transmitted to the housing 30 via the fasteners 50 such that no thrust bearing is needed in the lower shell 43 of the housing. A smooth bearing (not shown) is molded into the lower housing 43 to take the small radial loads on the lower end of the input shaft 42.

Figure 5:
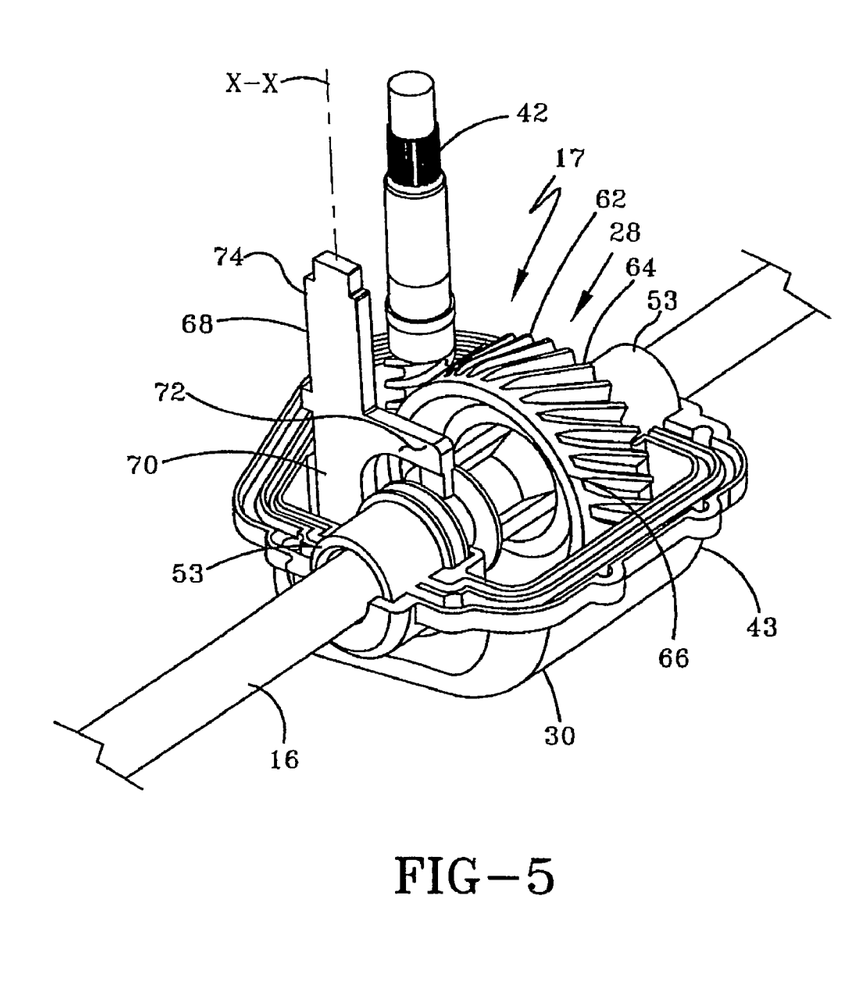
FIG. 5 is a fragmentary perspective view of the transmission of FIG. 3 with the top portion of the housing removed.
Figure 6:
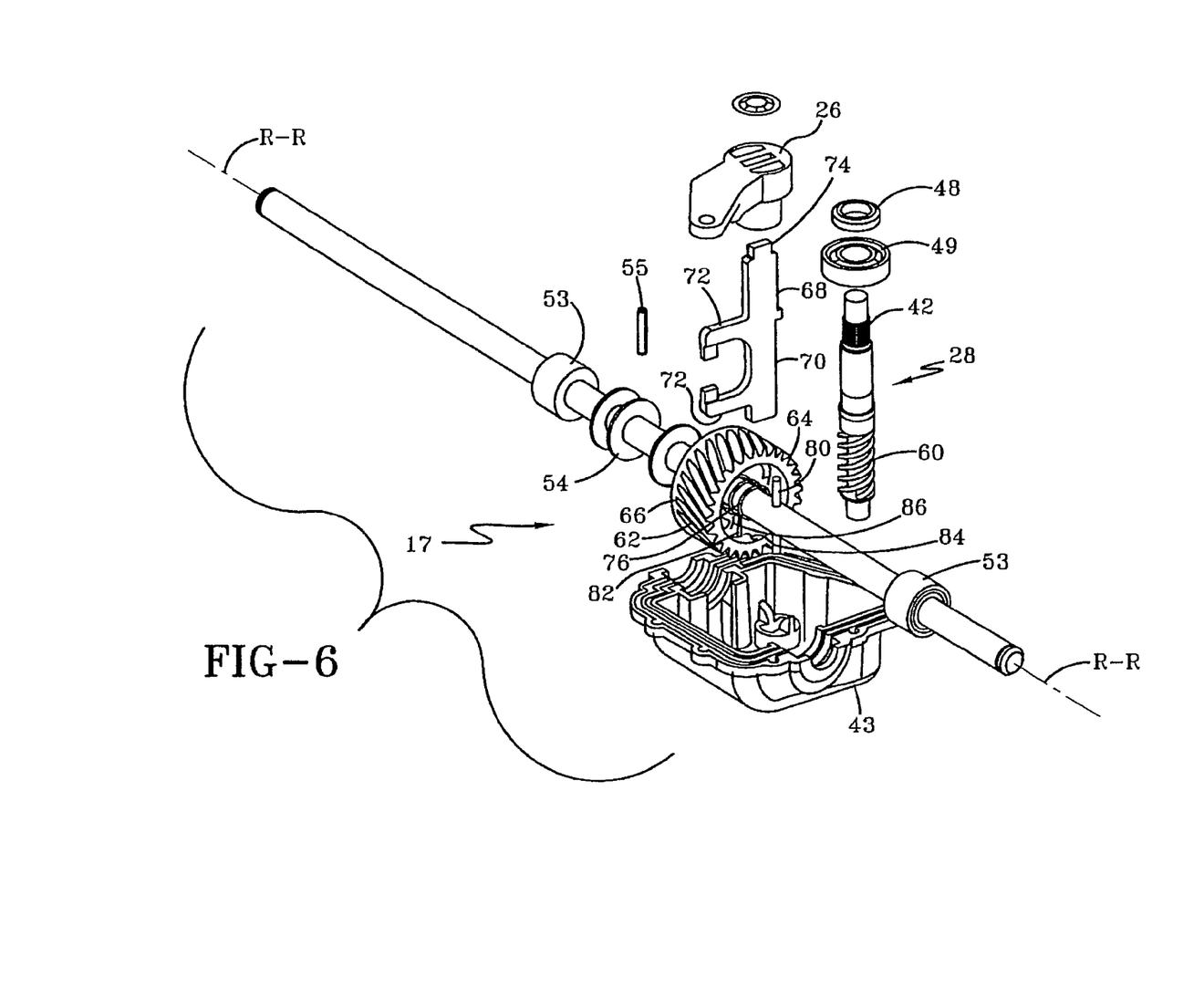
FIG. 6 is an exploded view of the transmission of FIG. 5.
Figure 7:
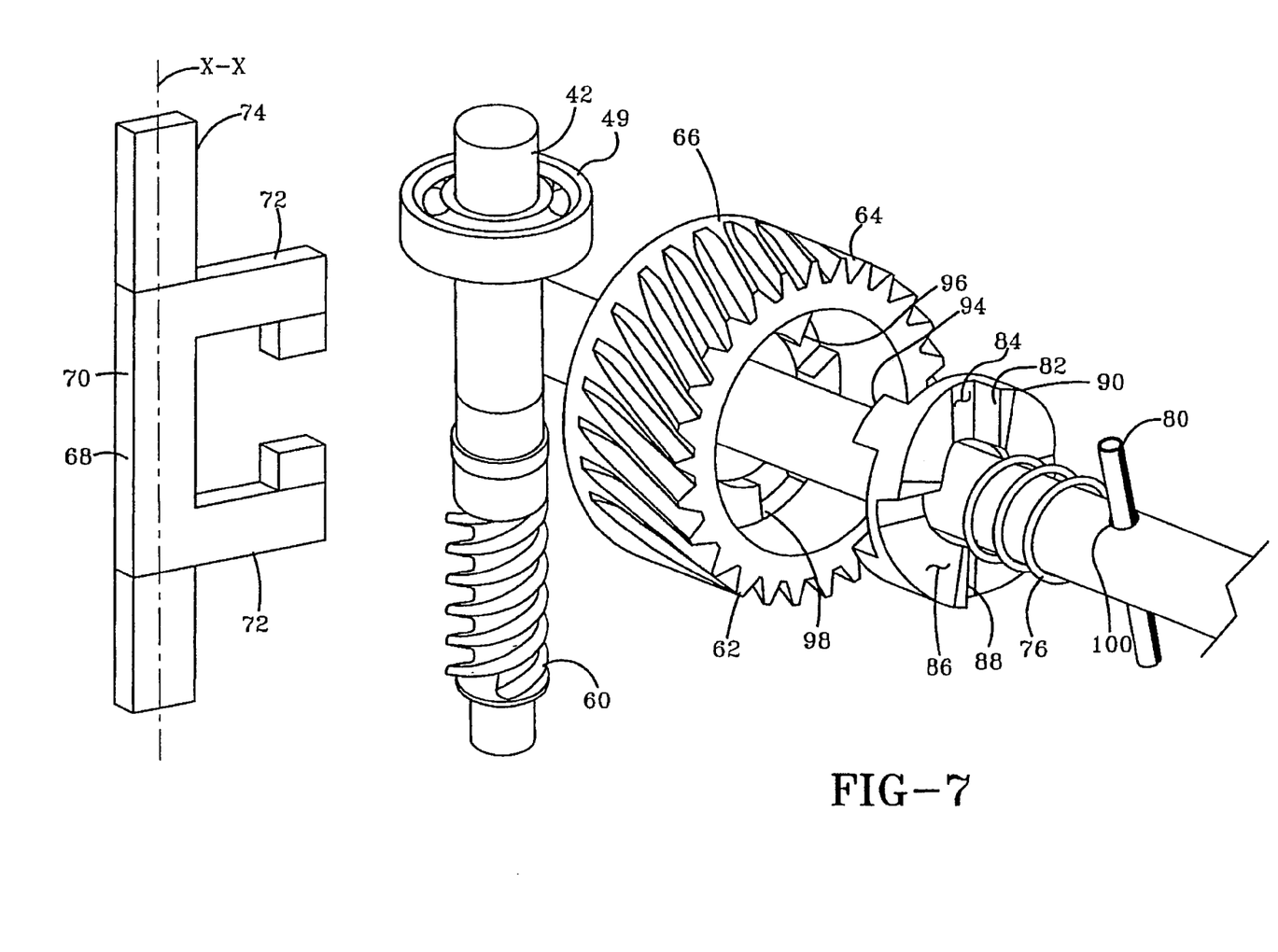
FIG. 7 is an exploded view of an alternate embodiment of a transmission of FIG. 5.

Referring also now to FIGS. 5 and 6 which illustrate the transmission 17 with the upper shell 44 of housing 30 removed for clarity, the axle 16 is rotatably supported within housing 30 by a pair of bushings 53 provided between housing shells 43 and 44. Washers 54 and a dowel pin 55 limit axial movement of the axle 16 with respect to the housing 30 while allowing for non-binding rotation of the axle about axis RR as shown in FIG. 6. Alternately, washers (not shown) and spacers (not shown) may be used to enable rotation about axis RR. The input shaft 42 of the clutch engaging mechanism 28 is partially disposed in the housing 30 and is rotatably supported within the housing 30 by the bearing 49 provided in the recess 47 (FIG. 4) in the upper shell 44. In an alternate embodiment, the lower end of the input shaft 42 is rotatably supported by a second roller bearing (not shown) positioned in the lower shell 43. Other means for rotatably supporting the input and outputs shafts are contemplated without departing from the scope of the invention.

The input shaft 42 and the output shaft 16 of the clutch engaging mechanism 28 are disposed substantially orthogonally to each other. The input shaft 42 has driving member located thereon comprising an endless screw or worm 60. The worm 60 is intermeshed with a worm wheel, broadly a driven gear 62, which is mounted on the output shaft 16. In the illustrated example, this driven gear 62 has helical threads 64 disposed on an outer periphery surface thereof. The threads 64 are configured to intermesh with the worm 60 of the input shaft 42 so that rotation of the input shaft 42 is transmitted to rotation of the driven gear 62. In one embodiment, the threads 64 only extend a partial way across the outer surface of the driven gear 62 to provide a reinforcement region in the form of a crown 66 which is free from threads. As illustrated, the driven gear 62 is in continual engagement with the worm 60 of the input shaft 42 of the clutch engaging mechanism 28. By continual engagement, it is meant that whenever the input shaft 42 rotates, the driven gear 62 will also be caused to rotate because of the intermeshed worm 60 and threads 64. The driven gear 62 is mounted on the output shaft 16 so that it is free to rotate about the shaft when the driven gear is positioned in a disengaged or unclutched position as will be described below. It will be noted that, in the illustrated embodiment, the worm 60 and the driven gear 62 are configured for a desired speed reduction. It is to be understood that any ratio of speed reduction could be used without departing from the scope of the invention.

As set forth above, the driven gear 62 is mounted on the output shaft 16 so that it can move axially on the output shaft 16. A clutch engaging shift fork 68, broadly a control member, is positioned adjacent the crown 66 of the driven gear 62 and is configured to contact and apply a force to axially slide the driven gear along the output shaft 16. In the illustrated examples, this shift fork 68 comprises a body portion 70 connecting two legs 72. Each leg 72 of the shift fork 68 is configured to engage the driven gear 62 so as to ensure even movement of the driven gear. Extending from one end of the shift fork 68 is an arm 74 projecting in a generally upward direction. This arm 74 engages the actuator lever 26 connected to the cable linkage 24 of FIG. 1 so that the operator can control the rotation of the shift fork 68 to selectively engage and disengage the clutch engaging mechanism 28. As can be seen, rotation of the actuator lever 26 causes the shift fork 68 to rotate about axis XX. As the shift fork 68 rotates in the counter-clockwise direction in FIG. 5, the legs 72 to push the driven gear 62 along the output shaft 16 in the axial direction and into a clutching position as will be explained below. Relaxation of the cable linkage 24 causes the actuator lever 26 and thus the shift fork 68 to return to their initial or unclutched positions. A resilient spring 76 mounted on the output shaft 16 urges the driven gear back to the initial or unclutched position, thus ensuring that the driven gear 62 slides to the unclutched position as the shift fork 68 rotates back to its unclutched position.

The driven gear 62 is adapted to co-act by toothed engagement with a projection 80 protruding from the output shaft 16. Several lugs or dog teeth 82 are disposed on an interior or clutching surface 84 of the driven gear 62. Alternately, the dog teeth 82 may extend from an end face of the driven gear 62 and configured to engage the projection 80. As shown, the interior surface 84 of the driven gear 62 has four dog teeth 82, each covering about 90 degrees of the inner circumference of the driven gear 62, although other number of teeth can be used. Desirably, the clutching surface 84 contains between two and six dog teeth. In one embodiment, each tooth 82 comprises a sloped leading edge 86 and a trailing edge 88 substantially parallel to a plane extending radially outward from the center of the driven gear 62. As the rotating driven gear 62 is moved axially toward the projection 80, the projection 80 engages one of the dog teeth 82 on the clutching surface 84 of the driven gear 62. As the projection 80 contacts the tooth 82, the leading edge 86 guides the projection 80 into a locked position secured by the trailing edge 88 of the tooth. Thus, during axial movement of the driven gear 62 in the direction toward the projection 80, the projection 80 engages the interior surface 84 of the driven gear 62 so as to ensure, under the influence of the rotational drive of the driven gear 62, a rotational drive of the projection 80, and consequently, a rotational drive of the output shaft 16 of the clutch engaging mechanism 28.

In one embodiment, the clutching surface 84 with the dog teeth 82 disposed thereon is molded as an integral part of the driven gear 62. Alternately, as shown in FIG. 6, the interior surface 84 with the dog teeth 82 is molded as a separate insert 90, and the insert is joined with the driven gear 62 using a toothed engagement 93. In this case, the insert 90 having the interior surface 84 is secured in rotation to the driven gear 62 by providing fingers 94 that fit within openings 96 provided on facing surface 98 of the driven gear 62 to rotatably secure the insert 90 and the driven gear 62. The driven gear is preferably made of a synthetic material such as glass reinforced nylon, however other suitable materials such as powder metal can be chosen using sound engineering judgment. In the embodiment having insert 90, the insert may be molded of a more durable metal material than the driven gear 62.

In one embodiment, the projection 80 is a drive pin or dowel secured to the output shaft 16. In the illustrated embodiment, opposite ends of the pin 80 extend from diametrically-opposed positions on the output shaft 16 to engage the dog teeth 82 on the driven gear 62. However, the pin can extend from only a single location on the output shaft 16 without departing from the scope of the invention. To permit the securement of the pin 80 to the output shaft 16, the shaft is provided with a radial through hole 100 through which the pin 80 is received such that the opposite ends of the pin extend from the output shaft 16. It is to be noted that other securing means such as polygonal ledges (not shown) provided on the output shaft 16 and the like could be envisioned to engage the driven gear 62 with the output shaft.

The assembly of the elements of the clutch engaging mechanism 28 described above is disposed within the housing 30. This housing 30 is rotatably mounted relative to the deck 14 of the lawnmower 10, under the influence of the control mechanism 22 of FIG. 1, to rotate about the output shaft 16 of the clutch engaging mechanism 28 in the direction of a variable and adjustable tension of the belt 38 of the transmission 17 when the clutch engaging mechanism 28 is in the engaged condition. Preferably, the housing 30 of the clutch engaging mechanism 28 is returned resiliently or by means of a counter-weight, to the position corresponding to the relaxed or slack condition of the belt 38 of the transmission 17.

Figure 8:
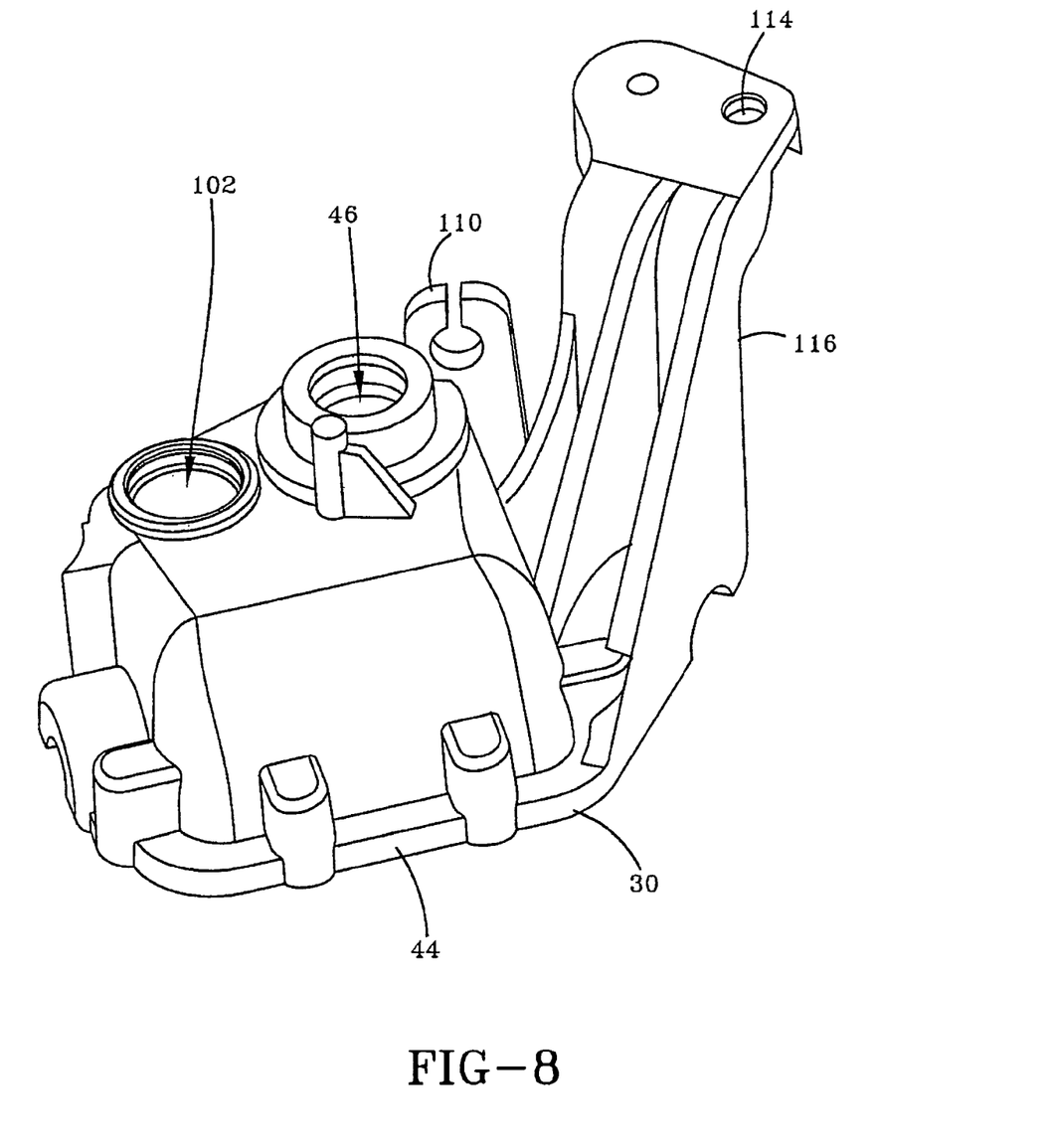
FIG. 8 is a fragmentary perspective view of the upper housing of the transmission of FIG. 3.

As illustrated in FIGS. 3 and 8, the upper shell 44 of the housing 30 contains a first opening 102 for receiving the actuator lever 26. The actuator lever 26 attached to the upper shell 44 through conventional snap-fit members inserted through the first opening 102. Opening 46 allows passage of the input shaft 42 into the housing 30. The upper shell 44 contains an abutment 110 through which a portion of the cable linkage 24 passes. A swege (not shown) in the linkage is configured to contact the abutment 110 upon full travel of the actuator lever 26 so that the cable linkage 24 can rotate the housing 30. In one embodiment, a spring (not shown) attached to the housing 30 through hole 112 (FIG. 2) and connected at its opposite end to the mower frame 14 asserts a force on the housing against the pull of the cable linkage 24 so that the housing 30 is biased to return to a position that imparts slack into the belt 38. Alternately, a spring can be connected to a hole 114 on an arm 116 of the housing 30 to bias the housing to the slack position of belt 38.

The control mechanism 22 is used to rotate the housing 30 into a position in which the belt 38 of the transmission 17 is tensioned. In the illustrated example, this control mechanism 22 is connected to the actuator lever 26 by the cable linkage 24. The actuator lever 26 is pivotally mounted on the housing 30 about the axis XX. This actuator lever 26 is mechanically coupled to the shift fork 68 of the clutch engaging mechanism 28 so as to bring about, during an initial pull of the cable linkage 24, the pivoting drive of the actuator lever 26 and the passage to the clutch engaged position of the clutch engaging mechanism 28 as set forth above. Further pull on the cable linkage 24 causes the swege attached to the cable linkage 24 to co-act with the abutment 110 provided on the housing 30. Additional travel by the cable linkage 24 causes the clutch engaging mechanism 28 to tip or rotate about the output shaft 16 in the direction to tension the belt 38 of the transmission 17. Thus, the position of the control mechanism 22 being selected as a function of the speed of advance to be achieved by the self-propelled lawnmower 10.

The tension in the belt 38 of the transmission is variable as a function of the path of the cable linkage 24. Continuing rotation of the housing 30 about the output shaft 16 through a longer path of cable linkage 24 within a predetermined movement range brings about an increase of the tension in the belt 38. Conversely, the operator may displace the cable linkage 24 over a path shorter than the maximum path length, generating a lesser rotation of the rotating housing 30 and accordingly less tension in the belt 38, such that the speed of advance of the machine is less than that obtained with that of the complete path of travel of the cable linkage 24. As a result, the speed of advance of the lawnmower 10 is a function of the path of the cable linkage 24 and accordingly of the angular position of the pivoting housing 30, with the angular position of the housing 30 giving rise to a variation of the tension of the belt 38. This variable tension of the belt 38 causes the rotational movement of the output pulley 34 to be transmitted to the input pulley 40 in varying degrees, thereby causing a variable speed driving of the wheels 18 of the lawnmower 10.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A transmission device for transmitting rotation from a primary motor shaft to an output shaft connected to ground engaging wheels for use with a self-propelled machine, the transmission comprising:

an input shaft in engagement with the primary motor shaft, said input shaft having a driving member comprising a worm;

an output shaft connected to at least one ground engaging wheel;

a driven gear mounted on the output shaft, the driven gear comprising a clutching surface and an outer engaging surface, wherein said driven gear is moveable axially along said output shaft between a first position wherein the driven gear is freely rotatable about said output shaft and a second position;

a control member configured to axially move the driven gear from the first position to the second position on the output shaft; and a projection extending from the output shaft, said projection being positioned on said output shaft such that when the driven gear is in the first position, the projection is disengaged from the clutching surface of the driven gear so as to uncouple the driven gear from said output shaft, and when the driven gear is moved to the second position, the projection engages the clutching surface of the driven gear in a locking relationship to produce a driving rotation of said output shaft by said driven gear.

2. The transmission device of claim 1 wherein the driven gear comprises a helically threaded gear.

3. The transmission device of claim 2 wherein the clutching surface of the driven gear comprises an interior surface of the driven gear having a plurality of dog teeth.

4. The transmission device of claim 3 wherein the interior surface of the driven gear has between two and six teeth.

5. The transmission device of claim 4 wherein each tooth comprises a sloped leading edge and a trailing edge substantially parallel to a plane extending radially outward from the center of the driven gear.

6. The transmission device of claim 3 wherein the driven gear with said interior surface is a single molded part.

7. The transmission device of claim 3 wherein the interior surface of the driven gear comprises an insert received by the driven gear.

8. The transmission device of claim 1 wherein the projection is a pin extending through an opening in the output shaft such that opposite ends of the pin project from the output shaft to engage the interior surface of the driven gear.

9. The transmission device of claim 1 wherein the control member comprises a fork with two branches, each branch of the fork configured to engage the driven gear.

10. The transmission device of claim 1 further comprising a return spring on the output shaft biased so as to return the driven gear to the disengaged first position so as to disengage the projection upon relaxation of the control member.

11. The transmission device of claim 1 wherein the driven gear is in continual engagement with the driving member such that the driven gear rotates whenever the driving member rotates.

12. The transmission device of claim 1 further comprising a transmission housing, said input shaft being rotatable within said housing by means of a bearing, said bearing positioned within a recess in said housing and secured within said recess by at least one fastener so that thrust loads on said input shaft are transmitted through said bearing and fastener to the housing.

13. The transmission device of claim 12 wherein said bearing is a roller bearing, and said housing further defining a second bearing molded into the housing such that only a single roller bearing is used to rotatably mount the input shaft in the housing.

14. The transmission device of claim 12 wherein said at least one fastener is received into a boss located adjacent the outer circumferential edge of the bearing recess such that a head of the fastener overlaps an outer race of the bearing so as to immobilize axially the bearing within the bearing recess.

15. The transmission device of claim 1 wherein the transmission device is rotatably mounted on the output shaft such that the position of the transmission device on the output shaft controls tension in a belt providing engagement between the primary motor shaft and the input shaft, wherein the rotational position of the transmission on the output shaft controls the tension of said belt to vary the rotational speed of said output shaft.

16. A wheeled self-propelled machine comprising a transmission according to claim 1.

17. A variable speed self-propelled machine comprising:
a machine deck;
a motor mounted on said machine deck, said motor having a primary motor shaft;
at least one ground engaging wheel;
a transmission operatively connecting said primary motor shaft and said ground engaging wheel, the transmission comprising:
an input shaft in engagement with the primary motor shaft, said input shaft having a driving member comprising a worm;
an output shaft;
a helically threaded driven gear rotatably mounted and moveable axially on said output shaft, the driven gear comprising a threaded exterior driving surface and an interior surface, the interior surface comprising a plurality of teeth, the outer engaging surface in continual engagement with the driving member so that the driven gear rotates whenever the driving member rotates;
a control member configured to move the driven gear axially along the output shaft from a first position to a second position, the control member comprising a fork with two branches, each branch of the fork contacting the driven gear; and
a projection secured in rotation with the output shaft and extending from the output shaft such that the projection engages the interior teeth of the driven gear, said projection being positioned on said output shaft such that when the driven gear is in the first position, the projection is disengaged from the interior surface of the driven gear such that the driven gear is uncoupled from said output shaft, and when the driven gear is moved to the second position, the projection engages the interior surface of the driven gear in a locking relationship to produce a driving rotation of said output shaft.

18. The machine of claim 17 wherein the interior surface of the driven gear is molded as part of the driven gear and said teeth having a sloped leading edge and a trailing edge.

19. The machine of claim 17 wherein the interior surface of the driven gear comprises an insert received by the driven gear.

20. The machine of claim 17 wherein the projection is a pin extending through an opening in the output shaft such that opposite ends of the pin project from the output shaft.

21. The machine of claim 17 further comprising a return spring on the output shaft biased so as to return the driven gear to the disengaged position so as to disengage the projection upon relaxation of the control member.

22. The machine of claim 17 further comprising a transmission housing, said input shaft being rotatably secured in said housing with a bearing, said bearing positioned within a recess within said housing and secured within said recess by fasteners so that thrust loads on said input shaft are transmitted through said bearing and fasteners to the housing.

23. The machine of claim 22 wherein said bearing is a roller bearing, and said housing further defining a second bearing molded into the housing such that only a single roller bearing is used to rotatably mount the input shaft in the housing.

24. The machine of claim 17 wherein the primary motor shaft has an output pulley mounted thereon and the input shaft has an input pulley mounted thereon, the machine further comprising a belt to transmit rotational movement of the output pulley to the input pulley, wherein the rotational position of the transmission on the output shaft controls the tension of said belt so as to vary the rotational speed of said output shaft.

25. The machine of claim 17 wherein said machine is a lawn mower.

26. A propelled machine having a motor driving at least one ground engaging wheel, the machine having transmission device for transmitting rotation from a primary motor shaft to an output shaft driving said ground engaging wheel, the propelled machine comprising:
a machine deck;
a motor mounted on said machine deck, said motor having a primary motor shaft;
at least one ground engaging wheel;
a transmission operatively connecting said primary motor shaft and said ground engaging wheel, the transmission comprising:
an input shaft in engagement with the primary motor shaft, said input shaft having a worm;
an output shaft;

a helically threaded driven gear rotatably mounted and moveable axially on said output shaft, the driven gear comprising an exterior driving surface and an interior surface, the outer engaging surface in constant engagement with the worm so that the driven gear rotates whenever the input shaft rotates;

a control member configured to axially move the driven gear along the output shaft from a first position to a second position; and means for rotatably securing the driven gear to the output shaft such that such that when the driven gear is in the first position, the driven gear is uncoupled from said output shaft, and when the driven gear is moved to the second position, the driven gear is coupled to the output shaft so that the output shaft rotates with said driven gear.

27. The propelled machine of claim 26 wherein the driven gear comprises an exterior driving surface and an interior surface, the outer engaging surface being in continual engagement with the worm so that the driven gear rotates whenever the input shaft rotates, and wherein the control member comprises a fork with two branches, each branch of the fork being in contact with the driven gear, said means for securing the driven gear to the output shaft comprising a projection extending from the output shaft, the projection being positioned on said output shaft such that when the driven gear is in the first position, the projection is disengaged from the interior surface of the driven gear such that the driven gear is uncoupled from said output shaft, and when the driven gear is moved to the second position, the projection engages the interior surface of the driven gear in a locking relationship to produce a driving rotation of said output shaft.

28. The propelled machine of claim 27 wherein the interior surface comprises a plurality of teeth, said teeth having a sloped leading edge and trailing edges substantially on a plane extending radially outward from the center of the driven gear.

29. A transmission device for transmitting rotation from a primary motor shaft to an output shaft for use with a self-propelled lawnmower, the transmission comprising:
    a drive pulley mounted on a primary motor shaft;
    a driven pulley;
    a belt between said drive pulley and said driven pulley to transmit rotation of said drive pulley to said driven pulley;
    a clutch engaging mechanism having an input shaft connected to said driven pulley and an output shaft coupled to wheels of the lawnmower, wherein the clutch engaging mechanism comprises:
    a worm on said input shaft;
    a driven gear mounted on the output shaft comprising an interior clutching surface and an outer engaging surface, said outer surface being in continual engagement with the worm, wherein the driven gear is moveable axially along said output shaft between a first position where the driven gear is freely rotatable about said output shaft and a second position;
    a control member configured to axially move the driven gear from the first position to the second position on the output shaft; and
    a projection secured in rotation with the output shaft, said projection being positioned on said output shaft such that when the driven gear is in the first position, the projection is disengaged from the interior surface of the driven gear to uncouple the driven gear from said output shaft, and when the driven gear is moved to the second position, the projection engages the interior surface of the driven gear in a locking relationship to produce a driving rotation of said output shaft; and
    wherein the clutch engaging mechanism is disposed within a housing mounted rotatably about the output shaft under the action of a pivoting lever that projects from the housing, wherein the pivoting lever is mechanically coupled to the control member of the clutch engaging mechanism so as to cause, during pivotal driving of the lever, passage to the clutch engaged position of the clutch engaging mechanism, then, in the second instance, by co-action of the lever with an abutment provided on the housing, rotation of the housing in a direction to place under variable tension the belt of the transmission,
    wherein a variation of a speed of the machine is obtained by variation of the tension applied to the belt.

30. The transmission according to claim 29, wherein the pivoting lever is resiliently returned to the unclutched position of the clutch engaging mechanism by a resilient return member having a resistance to traction less than that of a resilient return member of the housing in the relaxed position of the belt.

31. A wheeled self-propelled lawnmower comprising a transmission according to claim 29.

32. A transmission device for transmitting rotation from a primary motor shaft to an output shaft, the transmission comprising:
    a driving member in engagement with the primary motor shaft;
    a driven gear mounted on the output shaft comprising a clutching surface and an outer engaging surface, the clutching surface comprising a plurality of teeth fixed in rotation with the driven gear and said outer surface being in continual engagement with the driving member, wherein the driven gear is freely rotatable on said output shaft;
    a projection secured in rotation with the output shaft, wherein the projection is a pin extending through an opening in the output shaft such that opposite ends of the pin project from the output shaft to engage the interior teeth of the driven gear; and
    a control member configured to establish a first configuration between the driven gear and the projection and a second configuration between said driven gear and the projection, such that when the driven gear and said projection are in the first configuration, the projection is disengaged from the interior surface of the driven gear such that the driven gear is uncoupled from said output shaft, and when the driven and said projection are in the second configuration, the projection engages the interior surface of the driven gear in a locking relationship to produce a driving rotation of said output shaft.

33. The transmission device of claim 32 wherein said teeth have a sloped leading edge and trailing edges substantially on a plane extending radially outward from the center of the driven gear.

* * * * *